(12) United States Patent
Fukumasa et al.

(10) Patent No.: US 8,811,221 B2
(45) Date of Patent: Aug. 19, 2014

(54) BASE STATION DEVICE, MOBILE STATION DEVICE, AND COMMUNICATION CONTROL METHOD

(75) Inventors: Hidenobu Fukumasa, Osaka (JP); Shusaku Fukumoto, Osaka (JP); Shuichi Takehana, Osaka (JP); Shiro Sugahara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 60 days.

(21) Appl. No.: 13/635,871

(22) PCT Filed: Mar. 29, 2011

(86) PCT No.: PCT/JP2011/057742
§ 371 (c)(1),
(2), (4) Date: Sep. 18, 2012

(87) PCT Pub. No.: WO2011/122596
PCT Pub. Date: Oct. 6, 2011

(65) Prior Publication Data
US 2013/0003597 A1    Jan. 3, 2013

(30) Foreign Application Priority Data

Mar. 30, 2010  (JP) ................................. 2010-077391
Apr. 26, 2010  (JP) ................................. 2010-101409

(51) Int. Cl.
*H04L 12/26*        (2006.01)
(52) U.S. Cl.
USPC ......................................................... 370/252
(58) Field of Classification Search
CPC ....................................................... H04L 47/10
USPC ........................................... 370/252; 455/436
See application file for complete search history.

(56) References Cited

U.S. PATENT DOCUMENTS

| 6,580,919 | B1 | 6/2003 | Saito |
| 7,590,389 | B2* | 9/2009 | Anderson ..................... 455/67.7 |
| 7,907,540 | B2* | 3/2011 | Li et al. .......................... 370/252 |
| 8,571,001 | B2* | 10/2013 | Ogawa et al. ................. 370/345 |
| 2008/0031176 | A1 | 2/2008 | Hus |

(Continued)

FOREIGN PATENT DOCUMENTS

| JP | 2000-151502 A | 5/2000 |
| JP | 2008-516512 A | 5/2008 |
| JP | 2009-81513 A | 4/2009 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211, vol. 8.7.0, 2009, pp. 1-83.

(Continued)

*Primary Examiner* — Hassan Kizou
*Assistant Examiner* — Abdullahi Ahmed
(74) *Attorney, Agent, or Firm* — Birch, Stewart, Kolasch & Birch, LLP

(57) ABSTRACT

A base station device communicates with a mobile station device, either directly or via a relay station device. The base station device includes: a reference signal transmission instruction unit configured to instruct the mobile station device to transmit a reference signal; and a reference signal measurement instruction unit configured to instruct the relay station device to measure the reference signal that is transmitted by the mobile station device.

14 Claims, 14 Drawing Sheets

(56) References Cited

U.S. PATENT DOCUMENTS

| | | | |
|---|---|---|---|
| 2008/0045141 A1* | 2/2008 | Suga | 455/7 |
| 2009/0086648 A1* | 4/2009 | Xu et al. | 370/252 |
| 2013/0022025 A1* | 1/2013 | Watanabe et al. | 370/332 |

OTHER PUBLICATIONS

ZTE, "Impact of Insufficient Link Adaptation in Type II Relay", 3GPP TSG-RAN WG1, R1-093199, vol. 58, 2009, pp. 1-4.

* cited by examiner

FIG. 4

| CQI | SINR[dB] |
|---|---|
| 0 | ~ −10 |
| 1 | −10 ~ −8 |
| 2 | −8 ~ −6 |
| 3 | −6 ~ −4 |
| ... | ... |
| 15 | 18 ~ |

BASE STATION DEVICE, MOBILE STATION DEVICE, AND COMMUNICATION CONTROL METHOD

TECHNICAL FIELD

The present invention relates to a base station device, a mobile station device, and a communication control method.

The subject application claims priority based on the patent application No. 2010-077391 filed in Japan on Mar. 30, 2010 and the patent application No. 2010-101409 filed in Japan on Apr. 26, 2010, and incorporates by reference herein the content thereof.

BACKGROUND ART

At present, studies are undertaken regarding LTE (Long Term Evolution), which is the next-generation mobile communication system. The physical channel in LTE is described in Non-Patent Document 1. In the physical layer in LTE, the downlink from the base station device (hereinafter referred to as eNB "evolved Node B" as well) to the mobile station device (hereinafter referred to as UE "user equipment" as well) is constituted by downlink physical channels and downlink physical signals.

In this case, the downlink physical signals are constituted by a reference signal and a synchronization signal. The reference signal includes a cell-specific reference signal, a UE-specific reference signal, and an MBSFN reference signal. The synchronization signal and the cell-specific reference signal are signals required for the UE to detect a cell, and signals required for channel demodulation.

A study is undertaken regarding the use of the use of a relay node (RN, hereinafter referred to as "relay station device") that relays signals at the UE and eNB. The RN is connected to the network via a specific eNB, the eNB that connects the RN being known as a donor eNB.

As donor nodes, a Type 1, which has a physical ID different from the donor eNB, and a Type 2, which does not have a cell different from the eNB are defined.

An UE that uses a Type 1 RN for relaying calculates and feeds back the CQI (channel quality index) from the SINR (signal-to-interference-plus-noise ratio) of the cell-specific reference signal received from the RN, and from the receiving performance. The RN selects an appropriate resource in response to the received CQI, determines an MCS (modulation and coding scheme) and transmits these to the UE.

PRIOR ART DOCUMENTS

Non-Patent Documents

Non-Patent Document 1: 3GPP TS36.211 LTE Physical Channels and Modulation v8.7.0.
Non-Patent Document 2: ZTE, Impact of Insufficient Link Adaptation in Type II Relay, 3GPP TSG-RAN R1-093199, Aug. 24 to 28, 2009.

DISCLOSURE OF INVENTION

Problem to be Solved by the Invention

A Type 2 RN, however, does not have a unique physical cell ID and does not become an element that forms a new cell. For example, a Type 2 RN does not relay all the signals transmitted by the eNB, and does not a transmit control channels such as the synchronization signal, the cell-specific reference signal, and the PDCCH. That is, a mobile station device (UE) that uses a Type 2 relay station device (RN) for relaying cannot receive a cell-specific reference signal from the RN.

Thus, with this UE, in order to calculate the CQI using the cell-specific reference signal received from the donor eNB, there is the problem of not being able to calculate a CQI that matches the communication path.

The present invention was made in consideration of the above-noted points, and has as an object to provide a base station device, a mobile station device, and a communication control method capable of calculating a CQI that matches the communication path.

Means to Solve the Problem (1) The present invention was made to solve the above-described problem, a first aspect of the present invention is a base station device communicating with a mobile station device, either directly or via a relay station device, the base station device including: a reference signal transmission instruction unit configured to instruct the mobile station device to transmit a reference signal; and a reference signal measurement instruction unit configured to instruct the relay station device to measure the reference signal that is transmitted by the mobile station device.

(2) In the first aspect of the present invention, the base station device may include a quality information receiving unit configured to receive information that indicates a receiving quality at the relay station device and that indicates the measurement result with respect to the instruction from the reference signal measurement instruction unit.

(3) In the first aspect of the present invention, the base station device may include: an up access link quality measurement unit configured to measure the reference signal transmitted by the mobile station device; a difference calculation unit configured to calculate a difference between information that indicates the receiving quality at the relay station device received by the quality information receiving unit and information that indicates the receiving quality of a reference signal measured by the up access link quality measurement unit.

(4) In the first aspect of the present invention, the base station device may include a difference transmission unit configured to notify the mobile station device of the difference that is calculated by the difference calculation unit.

(5) In the first aspect of the present invention, the base station device may include: a correction value calculation unit, based on the difference that is calculated by the difference calculation unit, configured to calculate a correction value of information that indicates the receiving quality at the mobile station device.

(6) In the first aspect of the present invention, the information that indicates the receiving quality at the mobile station device may be channel quality information.

(7) In the first aspect of the present invention, the difference may be a difference of a signal-to-interference-plus-noise power ratio.

(8) In the first aspect of the present invention, the difference may be a difference of a received power.

(9) A second aspect of the present invention is a mobile station device communicating with a base station device, either directly or via a relay station device, the mobile station device including: a down direct link quality measurement unit configured to measure a reference signal that is transmitted by the base station; a reference signal transmission unit configured to transmit a reference signal; a difference receiving unit configured to receive difference information from the base station device; and a receiving quality calculation unit configured to calculate information that indicates the receiving quality at its own device, using the measurement result at the down direct link quality measurement unit and the difference information received by the difference receiving unit.

(10) In the second aspect of the present invention, the difference information may be information indicating a difference between information that indicates a receiving quality at the relay station device calculated using the reference signal transmitted by the reference signal transmission unit and information that indicates the receiving quality at the base station device calculated using the reference signal transmitted by the reference signal transmission unit.

(11) In the second aspect of the present invention, the difference information may be information indicating a difference between a signal-to-interference-plus-noise power ratio at the relay station device calculated using the reference signal transmitted by the reference signal transmission unit and a signal-to-interference-plus-noise power ratio at the base station device calculated using the reference signal that is transmitted by the reference signal transmission unit.

(12) In the second aspect of the present invention, the difference information may be information indicating a difference between a received power at the relay station device calculated using the reference signal that is transmitted by the reference signal transmission unit and a received power at the base station device calculated using the reference signal transmitted by the reference signal transmission unit.

(13) A third aspect of the present invention is a communication control method in a communication system including a base station device, a relay station device, and a mobile station device communicating with the base station device, either directly or via the relay station device, the communication control method including: instructing, by a reference signal transmission instruction unit, the mobile station device to transmit a reference signal; instructing, by a reference signal measurement instruction unit, the relay station device to measure the reference signal transmitted by the mobile station device;

measuring, by an up access link quality measurement unit, the reference signal transmitted to the base station device from the mobile station device; calculating, by a difference calculation unit, a difference between information that indicates a receiving quality at the relay station device, which is information of the measurement result with respect to the instruction by the reference signal measurement instruction unit and information indicating a receiving quality of the reference signal measured by the up access link quality measurement unit; measuring, by a down direct link quality measurement unit, the reference signal transmitted to the mobile station device from the base station device; and calculating, by a receiving quality calculation unit, information indicating the receiving quality at its own device, using the measurement result by the down direct link quality measurement unit and difference calculated by the difference calculation unit.

(14) A fourth aspect of the present invention is a communication control method in a communication system including a base station device, a relay station device, and a mobile station device communicating with the base station device, either directly or via the relay station device, the communication control method including: instructing, by a reference signal transmission instruction unit, the mobile station device to transmit a reference signal; instructing, by a reference signal measurement instruction unit, the relay station device to measure the reference signal transmitted by the mobile station device; measuring, by an up access link quality measurement unit, the reference signal transmitted to the base station device from the mobile station device; calculating, by a difference calculation unit, a difference between information indicating a receiving quality at the relay station device, which is information of the measurement result with respect to the instruction from the reference signal transmission instruction unit and information indicating a receiving quality of the reference signal measured at the up access link quality measurement unit; calculating, by a correction value calculation unit, based on the difference calculated by the difference calculation unit, a correction value of information indicating the receiving quality at the mobile station device; measuring, by a down direct link quality measurement unit, the reference signal transmitted to the mobile station device from the base station device; and calculating, by a receiving quality calculation unit, information indicating the receiving quality at the mobile station device, using the measurement result by the down direct link quality measurement unit and the difference calculated by the correction value calculation unit.

Effect of the Invention

According to the present invention, it is possible to calculate a CQI that matches the communication path.

BRIEF DESCRIPTION OF THE DRAWINGS

FIG. 4 is a simplified drawing showing an example of a quality information correspondence table according to the same embodiment.

BEST MODE FOR CARRYING OUT THE INVENTION

First Embodiment

The first embodiment of the present invention will be described below in detail, with references made to the drawings.

<Wireless Communication System 1>

Figure 1:
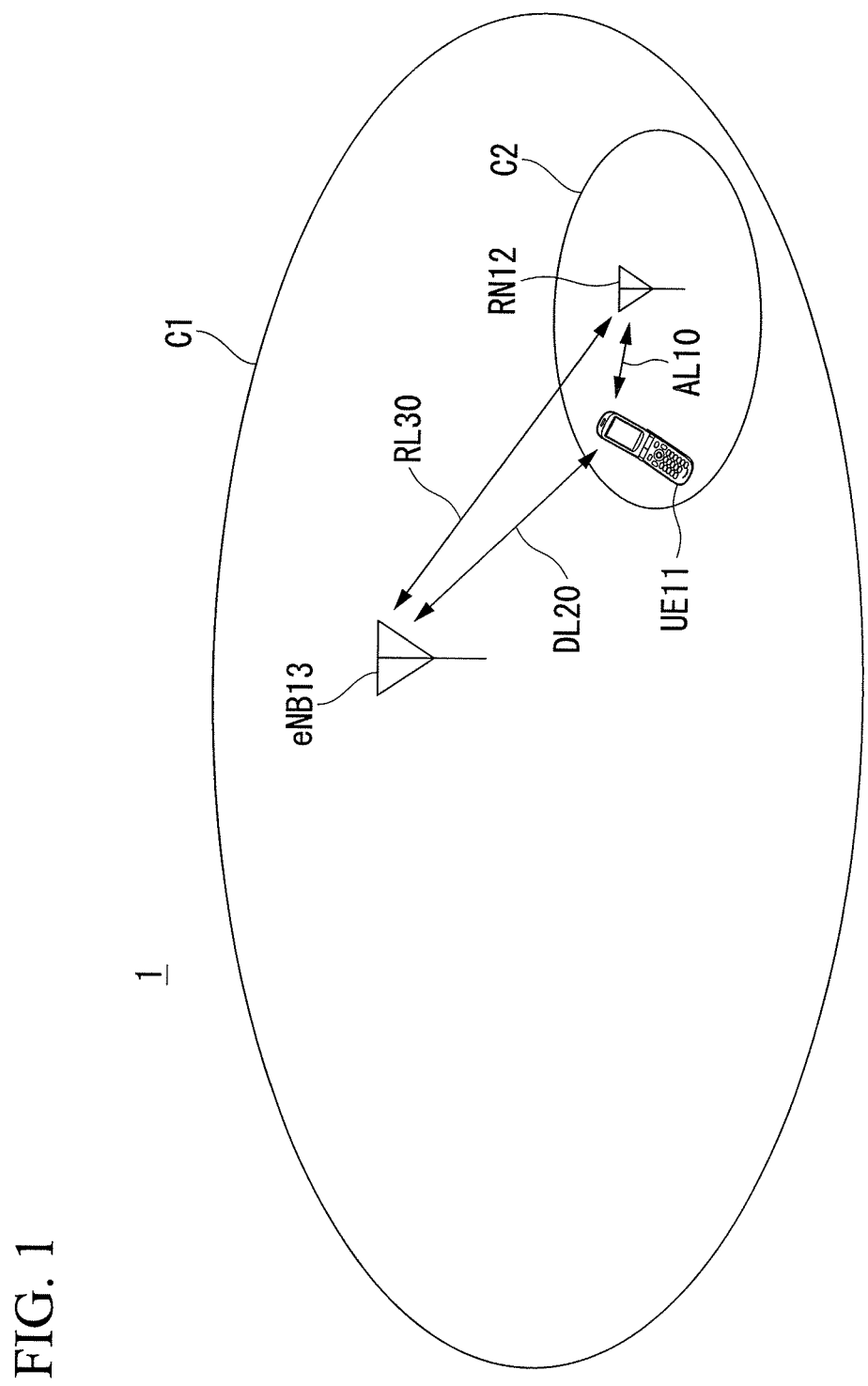
FIG. 1 is a conceptual drawing of a wireless communication system according to a first embodiment of the present invention.

FIG. 1 is a conceptual drawing of the wireless communication system 1 according to the first embodiment of the present invention. In this drawing, the wireless communication system 1 has a mobile station device (UE) 11, a base station device (eNB) 13, and a relay station device (RN) 12. The relay station device 12 relays signals between the mobile station device 11 and the base station device 13. The relay station device 12 is installed, for example, in an environment in which the field strength is weak, such as underground or in a building, or in an environment which is densely populated by users.

In FIG. 1, the mobile station device 11 is within the area of the cell C1 of the base station device 13. The mobile station device 11 communicates directly with the base station device 13, without going through the relay station device 12 (this communication mode being known as one-hop). The mobile station device 11 alternatively communicates with the base station device 13 via the relay station device 12 (this communication mode being known as two-hop). In this drawing, although the connection between the base station device 13 and the relay station device 12 is wireless, this connection may be by wire.

The communication path between the mobile station device 11 and the base station device 13 will be called the direct link (DL) 20. The communication path between the mobile station device 11 and the relay station device 12 will be called the access link (AL) 10. The communication path between the base station device 13 and the relay station device 12 will be called the relay link (RL) 30 (also known as backhaul).

Although FIG. 1 describes the case of the wireless communication system 1 having one base station 13, the wireless communication system 1 may have a plurality of base stations devices 13. Also, although FIG. 1 describes the case in which the wireless communication system 1 has one relay station device 12 and one mobile station 11 within the area of the base station device 13, the wireless communication system 1 may have a plurality of RNs 12 and a plurality of mobile station devices 11. That is, one base station device 13 may communicate with a plurality of relay station devices 12. Also, one base station device 13 may communicate with a plurality of mobile station devices 11, either directly or via a relay station device 12. By disposing a plurality of relay station devices 12 within the area of one base station device 13, the effect is the same as disposing many cells with small areas, thereby achieving the effect of increasing the number of mobile station devices that can be accommodated per unit of surface area. Additionally, by using a relay station device 12 rather than the eNB, it is possible to achieve low-cost installation and operation.

Figure 2:
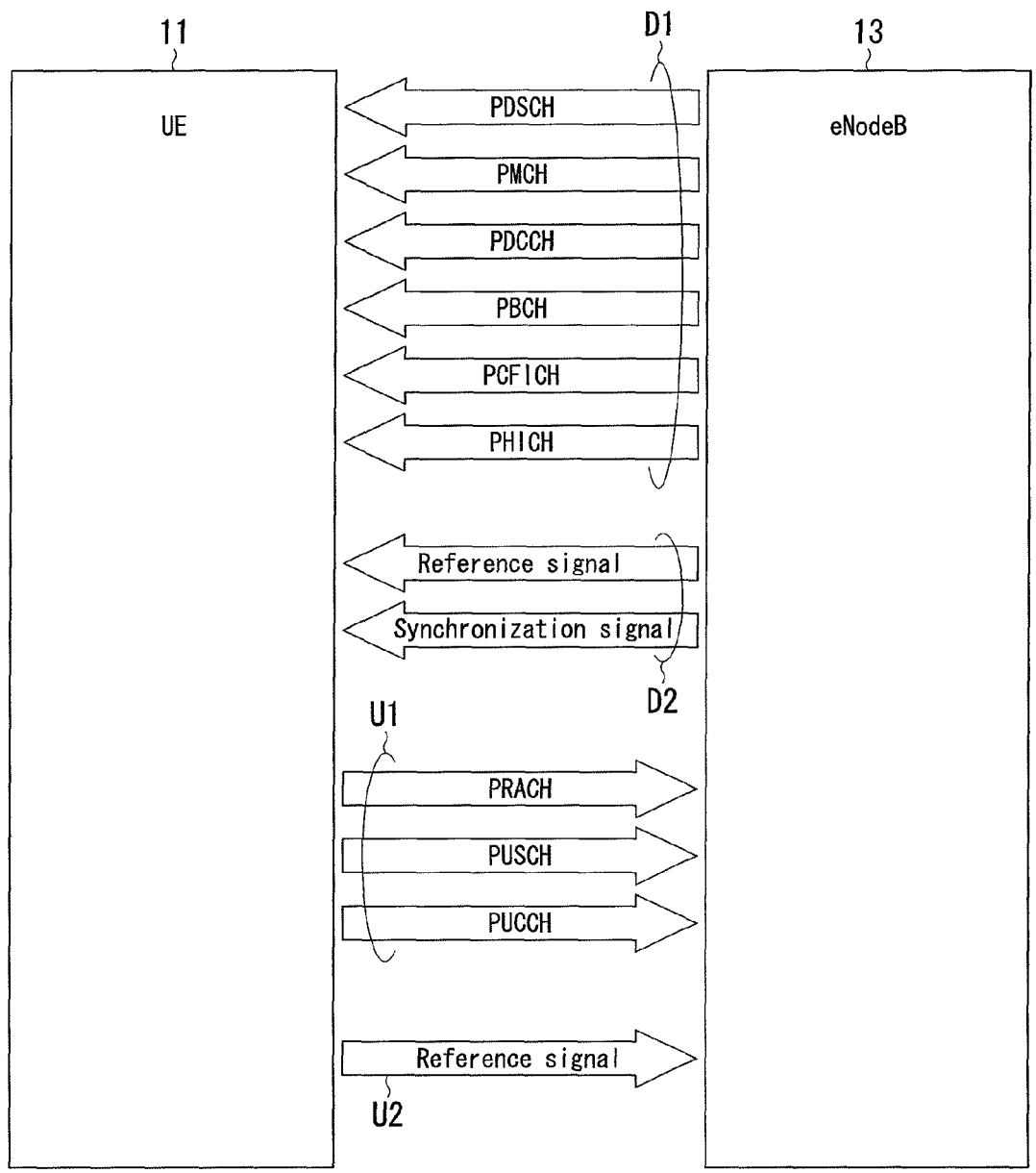
FIG. 2 is a simplified drawing showing the physical layer according to the same embodiment.

FIG. 2 is a simplified drawing that shows the physical layer according to the present embodiment. This drawing shows the physical layer in communication between the mobile station device 11 and the base station device 13.

In this drawing, the physical channels are constituted by the downlink physical channels D1 and the downlink physical channels D2 from the base station device 13 to the mobile station device 11. The physical channels are also constituted by the uplink physical channels U1 and the uplink physical channel U2 from the mobile station device 11 to the base station device 13.

The downlink physical channels D1 are constituted by a physical downlink shared channel (PDSCH) that transmits data, a physical multicast channel (PMCH) that transmits a multicast channel, a physical downlink control channel (PDCCH) that transmits L1/L2 control information, a physical broadcast channel (PBCH) that transmits cell-specific notification information, a physical control format indicator channel (PCFICH) that transmits the number of OFDM symbols that transmit the PDCCH, and a physical hybrid ARQ indicator channel (PHICH) that transfers ACK/NACK corresponding to an uplink HARQ.

The downlink physical channels D2 are constituted by a reference signal and a synchronization signal. The reference signal includes a cell-specific reference signal, a UE-specific (mobile station-specific) reference signal, and an MBSFN reference signal. The synchronization signal and the cell-specific reference signal are signals required for the detection of a cell by the mobile station device 11, and signals required for channel demodulation.

The uplink physical channels U1 are constituted by a random-access channel (PRACH) that performs random access, an uplink shared channel (PUSCH) that transmits uplink data in accordance with base station device 13 schedule management, and an uplink control channel (PUCCH) that transmits control signals and the like related to the downlink signal.

The uplink physical channel U2 is constituted by a reference signal. The reference signal includes an SRS (sounding reference signal), and a DMRS (demodulation reference signal). The SRS is a reference signal that is mainly used in measurement of the communication path, and the DMRS is used for uplink channel demodulation.

<Mobile Station Device 11 Constitution>

Figure 3:
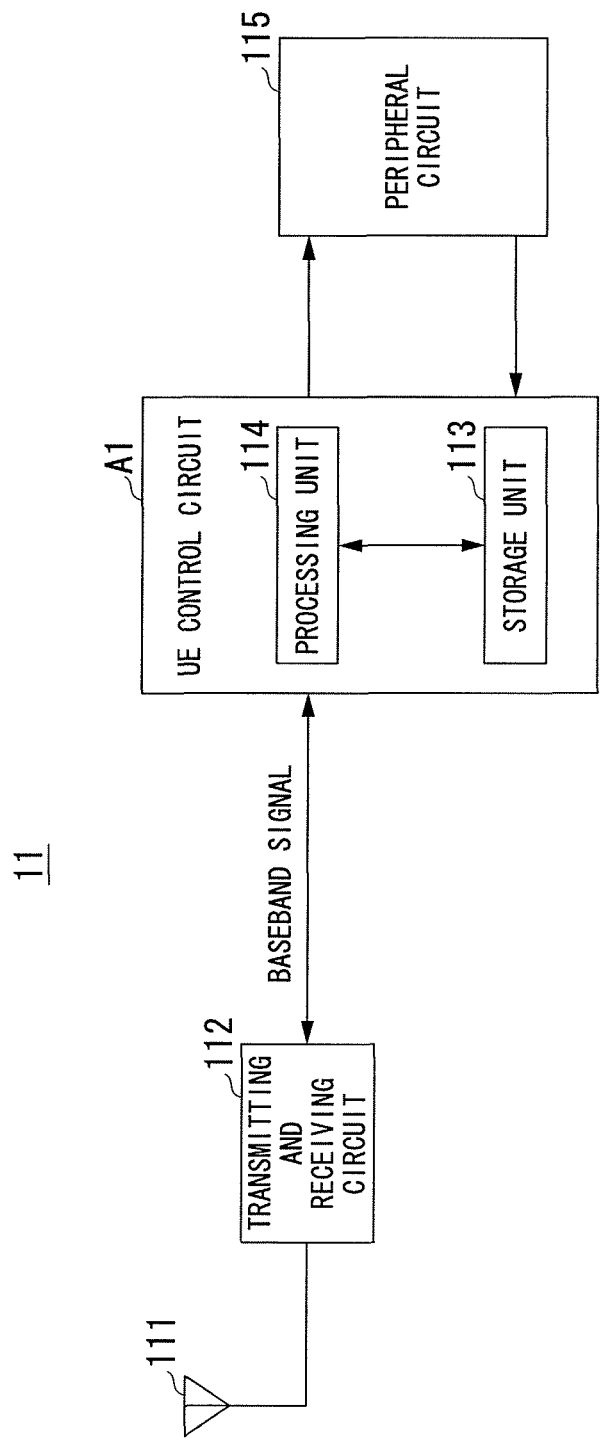
FIG. 3 is a simplified block diagram showing the hardware constitution of a mobile station device according to the same embodiment.

FIG. 3 is a simplified block diagram that shows the hardware constitution of the mobile station device 11 in the present embodiment. In this drawing, the mobile station device 11 is constituted so as to include a transmitting and receiving antenna 111, a transmitting and receiving circuit 112, a UE control circuit A1, and a peripheral circuit 115. In this case, the UE control circuit A1 is constituted so as to include a storage unit 113 and a processing unit 114.

The transmitting and receiving antenna 111 transmits and receives radio waves with a prescribed gain in a frequency band used by the mobile station device 11.

The transmitting and receiving circuit 112 amplifies the received signal received via the transmitting and receiving antenna 111 up to a prescribed power value. The transmitting and receiving circuit 112 converts the amplified received signal into a baseband signal and outputs the baseband signal to the UE control circuit A1.

The transmitting and receiving circuit 112 converts a baseband signal input from the UE control circuit A1 into a transmitted signal in the wireless frequency band. The transmitting and receiving circuit 112 amplifies the converted transmitted signal up to a prescribed power value and transmits the amplified wireless signal via the transmitting and receiving antenna 111.

The storage unit 113 of the UE control circuit A1 stores beforehand the pattern (waveform and reference signal pattern) of the reference signal (downlink cell-specific reference signal) to be transmitted by the base station device 13. The storage unit 113 stores beforehand the uplink reference signal pattern (SRS) that it itself is to transmit. The storage unit 113 stores beforehand the quality information correspondence table (refer to FIG. 4) that associates the SINR and the CQI. In this case, the CQI is an index that represents the transmission format that enables communication that satisfies an error rate condition that is used as a reference for the measured SINR, and in general this is obtained from the SINR by referencing a table (quality information correspondence table). Because the amount of information can be reduced compared to direct notification of the SINR, notification in lower layers is possible.

The processing unit 114 of the UE control circuit A1 performs analog/digital conversion, encoding, and modulation processing with respect to the data input from the peripheral circuit 115, so as to generate a baseband signal. The UE control circuit A1 outputs the generated baseband signal to the transmitting and receiving circuit 112. The processing unit 114 also performs demodulation, decoding, and digital/analog conversion with respect to the baseband signal input from the transmitting and receiving circuit 112, so as to generate a data signal, and outputs the data signal to the peripheral circuit 115.

The processing unit 114 extracts from the baseband signal input from the transmitting and receiving circuit 112 the reference signal transmitted by the base station 13. The UE control circuit A1 uses the extracted reference signal to calculate the desired received signal power. The processing unit 114 also calculates the interference signal power by signals and the like from other base station devices.

The processing unit 114, by calculating the ratio between the calculated desired received signal power and the interference signal power, calculates the SINR (SINR_DDL: down direct link SINR). The SINR is one parameter that indicates the quality of a wireless channel, and if the SINR is high, it is possible to reduce the redundancy of the channel encoding, or select multilevel modulation, so as to transmit a large amount of information with limited resources in the wireless communication system. If the SINR is low, because errors tend to occur, it is necessary to increase the redundancy of the channel encoding or reduce the number of levels in multilevel modulation, so that the transmission rate decreases. However, it is difficult to calculate the throughput directly from the SINR. The calculation of the SINR requires the received power, and the interference and noise power, and, although compared with using the received signal power P as a parameter, there is a greater calculation load, the SINR is a more-reliable parameter.

The storage unit 114 extracts from the baseband signal input from the transmitting and receiving circuit 112 information that indicates the ΔSINR (or ΔP) regarding which notification was made from the base station device 13. The storage unit 114, using the calculated SINR_DDL and the ΔSINR indicated by the extracted information, calculates the SINR (referred to as the corrected SINR).

The processing unit 114 references the quality information correspondence table stored by the storage unit 113 and converts the calculated SINR_DDL or corrected SINR into the CQI. The CQI converted from the SINR_DDL is called the uncorrected CQI, and the CQI converted from the corrected SINR is called the corrected CQI. The processing unit 114 generates a baseband signal that includes information that indicates the converted CQI, and outputs the baseband signal to the transmitting and receiving circuit 112. The processing unit 105, based on the reference signal pattern stored by the storage unit 113, generates and outputs to the transmitting and receiving circuit 112 the reference signal.

Details of the processing performed by the UE control circuit A1 will be described later.

The peripheral circuit 115 has various circuits that control a display unit (not shown) and a speaker (not shown) or the like. For example, the peripheral circuit 115, based on a voice signal input from the UE control circuit A1, causes output of a voice from a speaker of a handset receiver unit. The peripheral circuit 115 also inputs a voice from a handset microphone unit and outputs the input voice signal to the UE control circuit A1. Also, the peripheral circuit 115 causes display of various information on the display unit in accordance with instructions from the UE control unit A1. Although one peripheral circuit 115 is shown in FIG. 3, the mobile station device 11 may have a plurality of peripheral circuits 115.

The above-described processing for analog/digital conversion includes but is not limited to, for example, sampling a voice signal at a sampling rate of 8 kHz and converting it into a digital signal. The processing for digital/analog conversion includes but is not limited to, for example, processing to convert, in the reverse direction, the digital signal to a voice signal. The above-described encoding and decoding processing includes but is not limited to, for example, processing for turbo encoding with a variable encoding rate, or processing for decoding using a Max-Log-MAP algorithm. The modulation and demodulation includes but is not limited to, for example, mapping a bit stream onto a signal using QPSK or 16QAM signal points or using soft-decision decoding that converts the baseband signal into a bit stream that include likelihood information.

Figure 4:
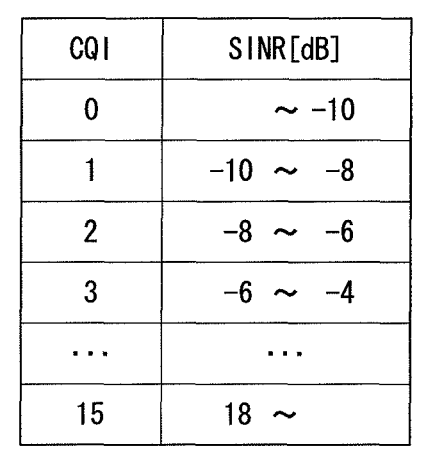

FIG. 4 is a simplified drawing that shows an example of the quality information correspondence table according to the present embodiment. As shown in the drawing, the quality information correspondence table has columns for each of the items CQI and SINR.

This drawing shows, for example, that if the SINR is lower than −10 dB, the CQI is 0. It also shows that if the SINR is −10 dB or higher and lower than −8 dB, the CQI is 1.

<Relay Station Device 12 Constitution>

Figure 5:
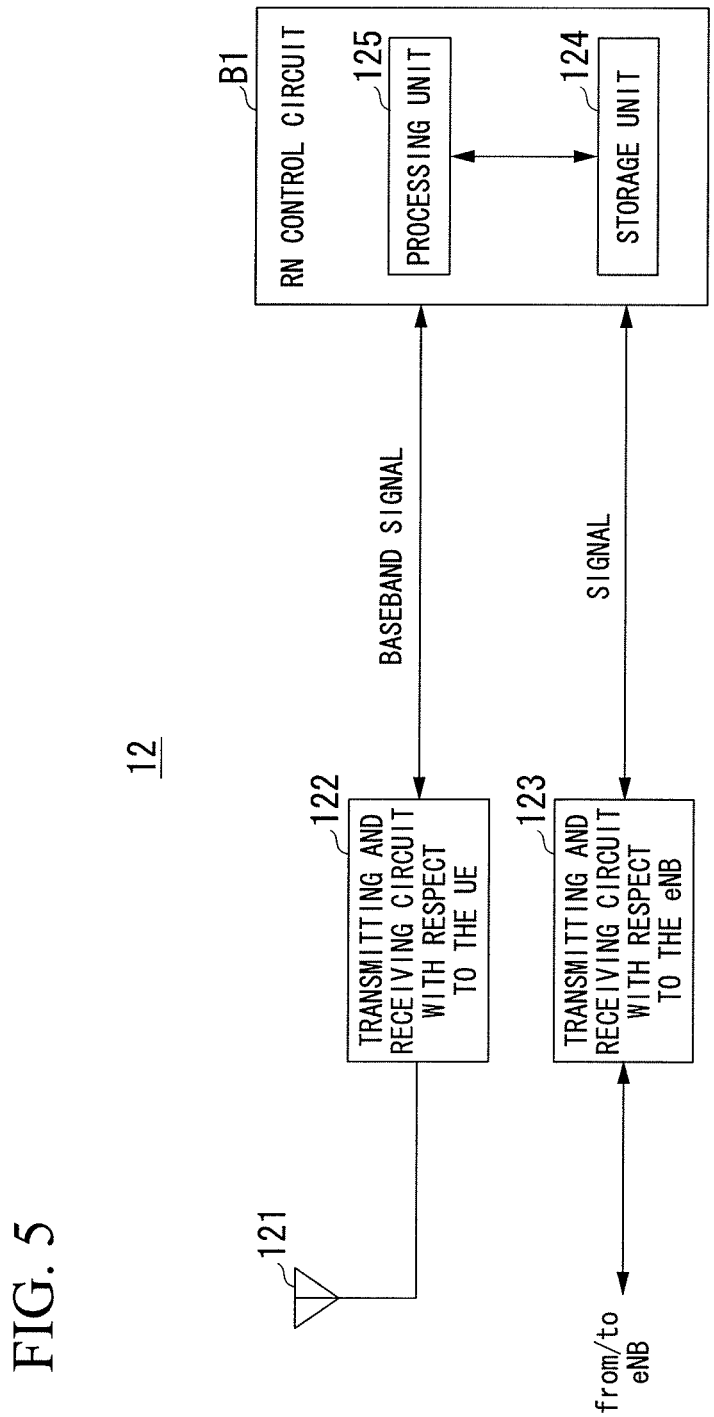
FIG. 5 is a simplified block diagram showing the hardware constitution of a relay station device according to the same embodiment.

FIG. 5 is a simplified block diagram that shows the hardware constitution of the relay station device 12 according to the present embodiment. In this drawing, the relay station device 12 is constituted so as to include a transmitting and receiving antenna 121, a transmitting and receiving circuit with respect to the UE 122, a transmitting and receiving circuit with respect to the eNB 123, and an RN control circuit B1. In this case, the RN control circuit is constituted so as to include a storage unit 124 and a processing unit 125.

The transmitting and receiving antenna 121 transmits and receives radio waves with a prescribed gain in a frequency band used by relay station device 12.

The transmitting and receiving circuit with respect to the UE 122 amplifies the received signal received via the transmitting and receiving antenna 121 up to a prescribed power value. The transmitting and receiving circuit with respect to the UE 122 converts the amplified received signal into a baseband signal and outputs the baseband signal to the RN control circuit B1.

The transmitting and receiving circuit with respect to the UE 122 converts the baseband signal input from the RN control circuit B1 into a transmitted signal in the wireless frequency band. The transmitting and receiving circuit with respect to the UE 122 amplifies the converted transmitted signal up to a prescribed power value, and transmits the amplified wireless signal via the transmitting and receiving antenna 121.

The transmitting and receiving circuit with respect to the eNB 123 transmits the signal input from the RN control circuit to the base station device 13. The transmitting and receiving circuit with respect to the eNB 123 also outputs the signal to the RN control circuit B1. The communication performed by the transmitting and receiving circuit with respect to the eNB 123 may be performed either by wire communication or by wireless communication. In the case of wireless communication, the transmitting and receiving circuit with respect to the UE 122 and the transmitting and receiving circuit with respect to the eNB 123 may be one transmitting and receiving circuit.

The storage unit 124 of the RN control circuit B1 stores beforehand the reference signal pattern to be transmitted by the mobile station device 11.

The processing unit 125 of the RN control circuit B1, by performing processing for analog/digital conversion, encoding, and modulation with respect to the signal input from the transmitting and receiving circuit with respect to the eNB 123, generates a baseband signal. The processing unit 125 outputs the generated baseband signal to the transmitting and receiving circuit with respect to the UE 122. The processing unit 125 also, by performing processing for demodulation, decoding, and digital/analog conversion with respect to the baseband signal input from the transmitting and receiving circuit with respect to the UE 122, generates a data signal. The processing unit 125 generates a control signal that includes information of the transmission destination (base station device 13), and outputs a signal constituted by the generated control signal and data signal to the transmitting and receiving circuit with respect to the eNB 123.

The processing unit 125 extracts from the baseband signal input from the transmitting and receiving circuit with respect to the UE 122 the reference signal (uplink SRS) transmitted by the mobile station device 11, and calculates the desired received signal power. The processing unit 125 also calculates the interference signal power of the signals and the like from other mobile station devices.

The processing unit 125, by calculating the ratio between the calculated desired received signal power and the interference signal power, calculates the SINR (SINR_UAL: up access link SINR). The processing unit 125 extracts information that indicates the CQI transmitted by the mobile station device 11 from the baseband signal input from the transmitting and receiving circuit with respect to the UE 122.

The processing unit 125 generates a data signal that includes information indicating the calculated SINR_UAL and the extracted CQI, and outputs the data signal to the transmitting and receiving circuit with respect to the eNB 123.

The details of the processing performed by the RN control circuit B1 will be described later.

<Base Station Device 13 Constitution>

Figure 6:
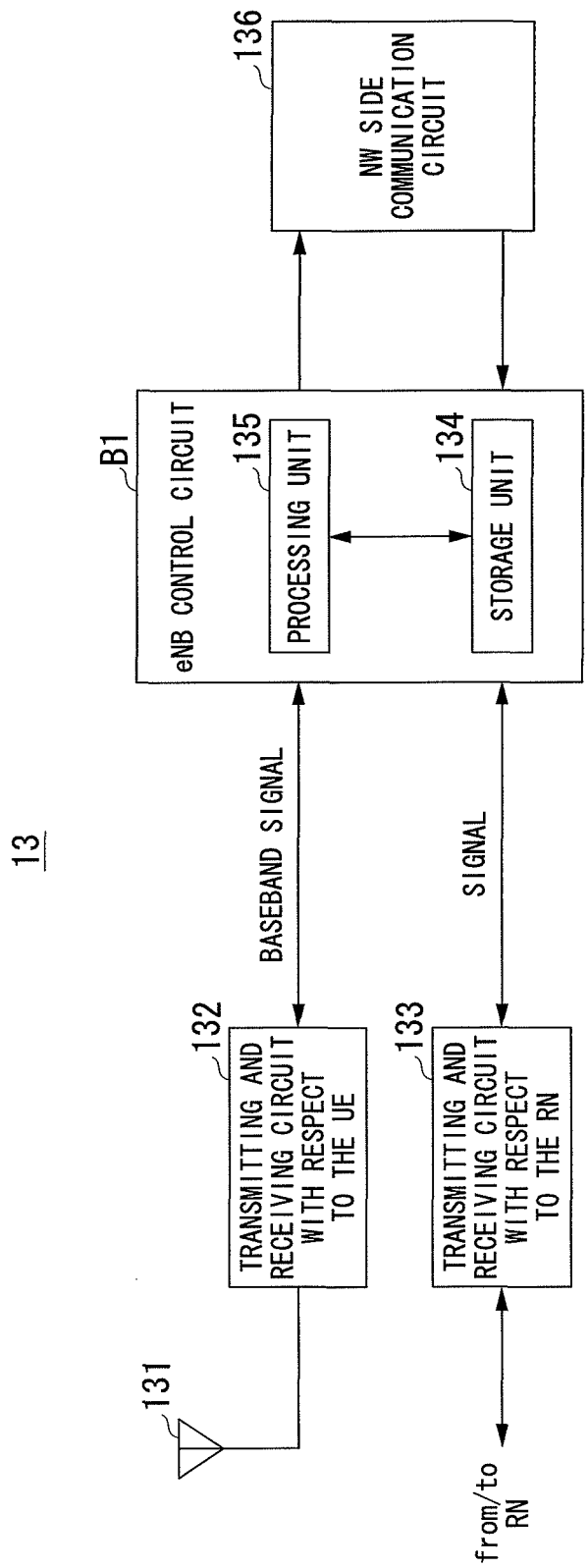
FIG. 6 is a simplified block diagram showing the hardware constitution of a base station device according to the same embodiment.

FIG. 6 is a simplified block diagram that shows the hardware constitution of the base station device 13 according to the present embodiment. In this drawing, the base station device 13 is constituted so as to include a transmitting and receiving antenna 131, a transmitting and receiving circuit with respect to the UE 132, a transmitting and receiving circuit with respect to the RN 133, an eNB control circuit C1, and an NW (network) side communication circuit 136. In this case, the eNM control circuit C1 is constituted so as to include a storage unit 134 and a processing unit 135.

The transmitting and receiving antenna 131 transmits and receives radio waves with a prescribed gain in a frequency band used by the base station device 13.

The transmitting and receiving circuit with respect to the UE 132 amplifies the received signal received via the transmitting and receiving antenna 131 up to a prescribed power value. The transmitting and receiving circuit with respect to the UE 132 converts the amplified received signal into a baseband signal and outputs the converted baseband signal to the eNB control circuit C1

The transmitting and receiving circuit with respect to the UE 132 converts the baseband signal input from the eNB control circuit C1 into a transmitting signal in the wireless frequency band. The transmitting and receiving circuit with respect to the UE 132 amplifies the converted transmitting signal up to a prescribed power value and transmits the amplified wireless signal via the transmitting and receiving antenna 131.

The transmitting and receiving circuit with respect to the RN 133 transmits the signal input from the eNB control circuit C1 to the relay station device 12. The transmitting and receiving circuit with respect to the RN 133 also outputs the signal to the eNB control circuit C1. The communication performed by the transmitting and receiving circuit with respect to the RN 133 may be performed by wire communication or wireless communication. In the case of wireless communication, the transmitting and receiving circuit with respect to the UE 132 and the transmitting and receiving circuit with respect to the RN 133 may be one transmitting and receiving circuit.

The storage unit 134 of the eNB control circuit 134 stores beforehand the reference signal (uplink SRS) pattern to be transmitted by the mobile station device 11.

The processing unit 135 of the eNB control circuit C1, by performing processing for analog/digital conversion, encoding, and modulation with respect to the signal input from the NW side communication circuit 136, generates a baseband signal. The processing unit 135 outputs the generated baseband signal to the transmitting and receiving circuit with respect to the UE 132 and the transmitting and receiving circuit with respect to the RN 133. The processing unit 135 also, by performing processing for demodulation, decoding, and digital/analog conversion with respect to the baseband signal input from the transmitting and receiving circuit with respect to the UE 132 and the transmitting and receiving circuit with respect to the RN 133, generates a data signal. The processing unit 135 outputs the generated data signal to the NW side communication circuit 136.

The processing unit 135 extracts from the baseband signal input from the transmitting and receiving circuit with respect to the UE 132 the reference signal (uplink SRS) transmitted by the mobile station device 11, and calculates the desired received signal power. The processing unit 135 also calculates the interference signal power of the signals and the like from other mobile station devices.

The processing unit 135, by calculating the ratio between the calculated desired received signal power and the interference signal power, calculates the SINR (SINR_UDL: up direct link SINR).

The processing unit 135 extracts from the baseband signal input from the transmitting and receiving circuit with respect to the UE 132 information that indicates the SINR_UAL transmitted by the relay station device 12 and information that indicates the CQI.

The processing unit 135 calculates the difference ΔSINR between the calculated SINR_UDL and the SINR_UAL indicated by the extracted information. In this case, if the SINR is calculated in dB (decibels), the processing unit 135 takes the difference between the SINR_UDL and the SINR_UAL as the ΔSINR, and if the SINR is calculated as an actual value, the ratio between the SINR_UDL and the SINR_UAL is taken as ΔSINR.

The processing unit 135, based on the CQI that is indicated by the extracted information, determines modulation scheme and encoding scheme to be used by the mobile station device 11.

The processing unit 135 notifies the mobile station device 11 via the transmitting and receiving circuit with respect to the UE 132 of the calculated ΔSINR and the determined modulation scheme and encoding scheme.

The details of the processing performed by the eNB control circuit C1 will be described later.

The NW side communication circuit 136 communicates with other base station devices.

<Processing Performed by the Control Circuits>

The processing performed by the UE control circuit A1, the RN control circuit B1, and the eNB control circuit C1 will be described in detail below, with references made to FIG. 7 to FIG. 9.

Figure 7:
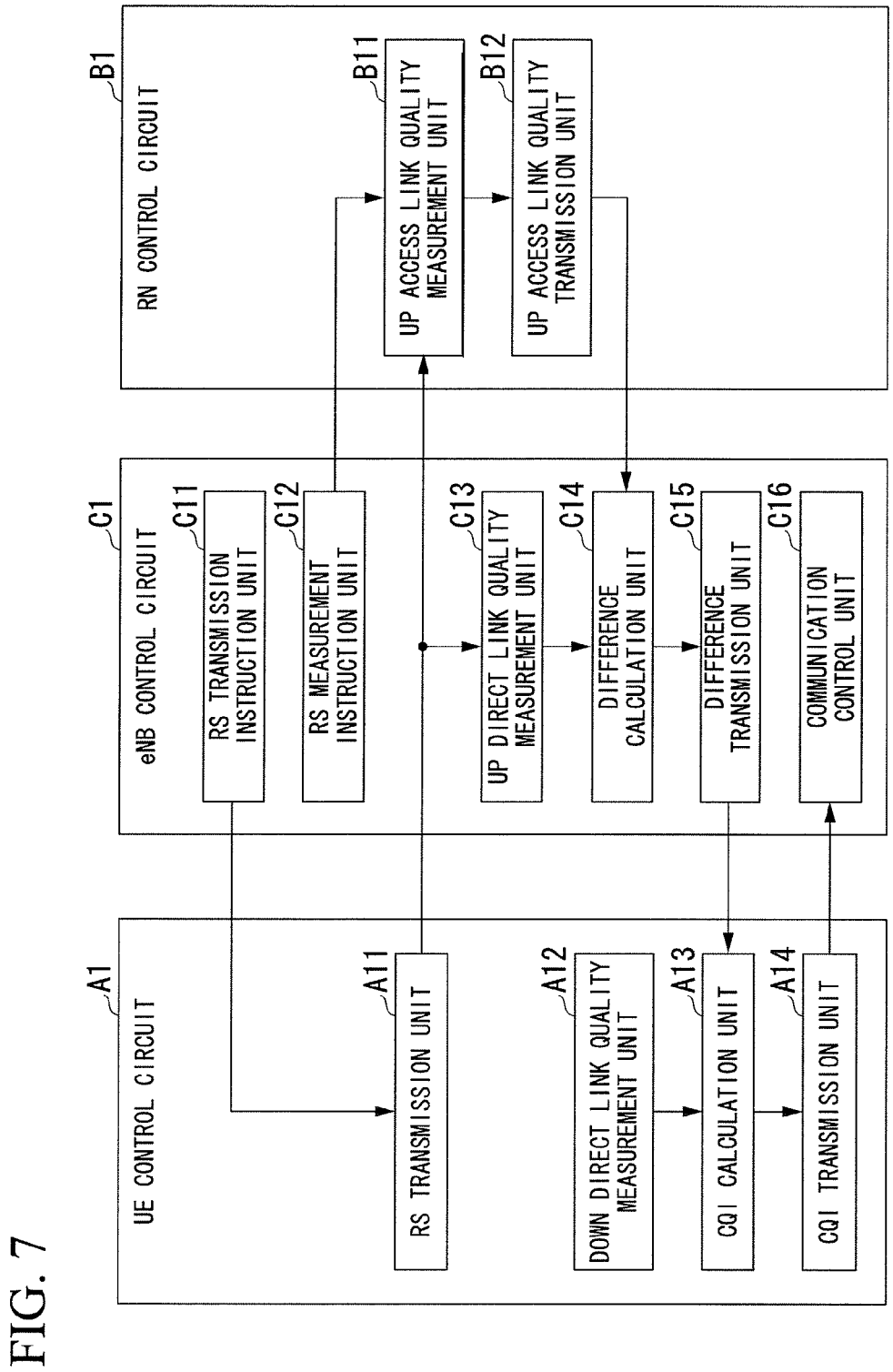
FIG. 7 is a simplified block diagram showing the logical constitution of control circuits according to the same embodiment.

FIG. 7 is a simplified block diagram that shows the logical constitution of the various control circuits according to the present embodiment. In this drawing, the UE control circuit A1 is constituted so as to include an RS (reference signal) transmission unit A11, a down direct link quality measurement unit A12, a CQI calculation unit A13, and a CQI transmission unit A14. The eNB control circuit C1 is constituted so as to include an RS transmission instruction unit C11, an RS measurement instruction unit C12, an up direct link quality measurement unit C13, a difference calculation unit C14, a difference transmission unit C15, and a communication control unit C16. The RN control circuit B1 is constituted so as to include an up access link quality measurement unit B11 and an up access link quality transmission unit B12.

Figure 8:
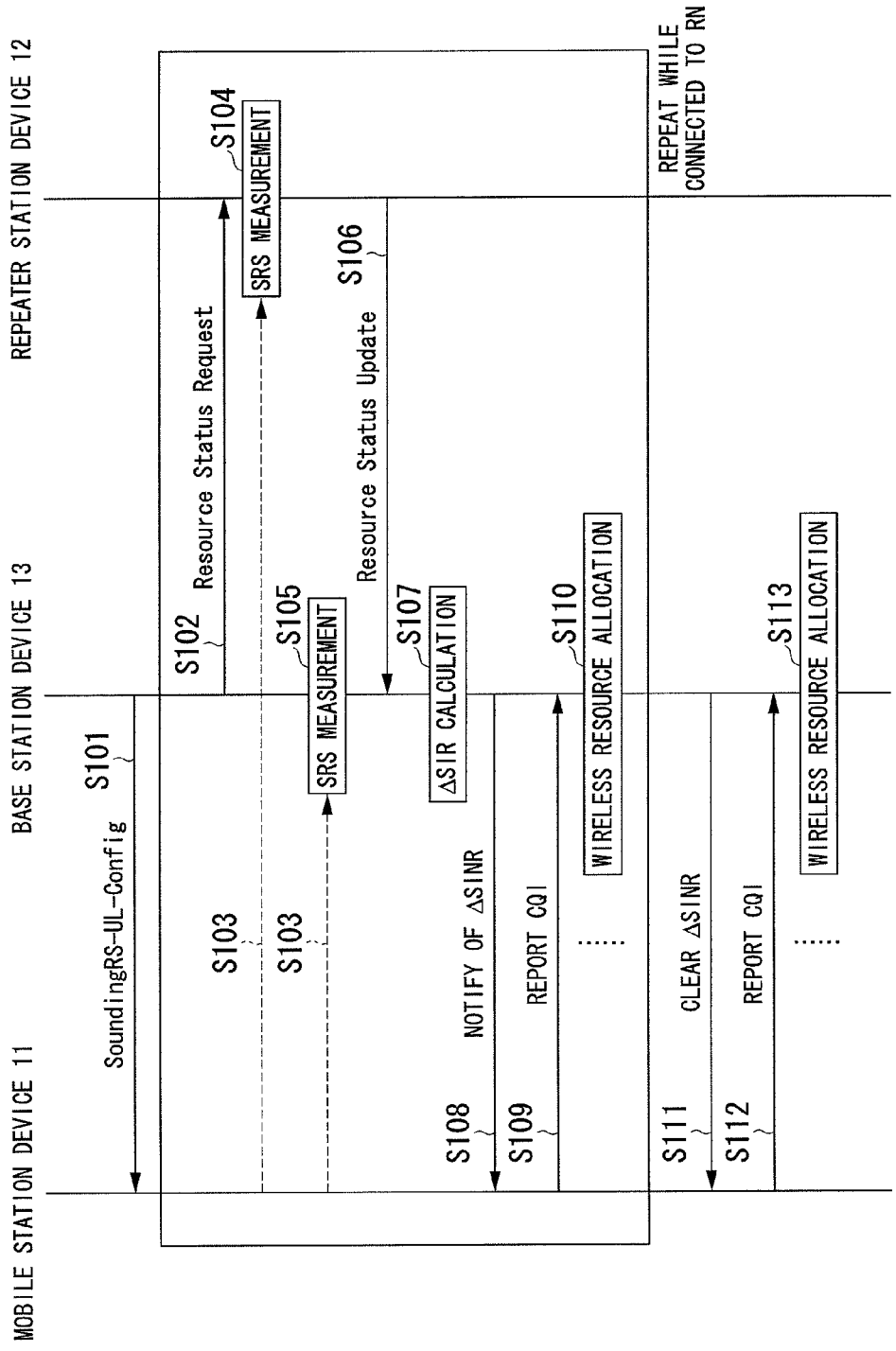
FIG. 8 is a sequence diagram showing an example of the operation of the wireless communication system according to the same embodiment.

FIG. 8 is a sequence diagram that shows an example of the operation of the wireless communication system 1 according to the present embodiment. The operation of the wireless communication system 1 shown in FIG. 8 will be described below, with references made to FIG. 7.

(Step S101) The RS transmission instruction unit C11 transmits an SRS transmission instruction (SoundingRS-UL-Config message), which instructs mobile station device 11 to transmit a reference signal. That is, the RS transmission instruction unit C11 (reference signal transmission instruction unit) instructs the mobile station device 11 to transmit the reference signal. In this case, the reference signal is (1) a signal of a known pattern and (2) a signal that enables distinction between a signal of the transmitting station device (desired station device) and another transmitting station device (interfering station device). After that, processing proceeds to step S102.

The RS transmission instruction unit C11 may transmit the SRS transmission instruction when the mobile station device 11 and the base station device 13 start to communicate. The RS transmission instruction unit C11 may transmit the SRS transmission instruction when the mobile station device 11 transitions from the condition of communicating with the base station device 13 by one-hop to the condition of communicating by two-hop via the relay station device 12. Also, the RS transmission instruction unit C11 may transmit the SRS transmission instruction when an instruction is transmitted to change from communication control using the uncorrected CQI to communication control using the corrected CQI.

(Step S102) The RS measurement instruction unit C12 transmits an SRS measurement instruction (Resource Status Request message), which instructs the measurement of the reference signal transmitted by the mobile station device 11, to the relay station device 12. That is, the RS measurement instruction unit C12 (reference signal measurement instruction unit) instructs the relay station device 12 to measure the reference signal transmitted by the mobile station device 11. After that, processing proceeds to step S103.

(Step S103) The RS transmission unit A11 transmits the reference signal. After that, processing proceeds to step S104.

(Step S104) The up access link quality measurement unit B11, using the reference signal transmitted at step S103, calculates the SINR_UAL. After that, processing proceeds to step S105.

(Step S105) The up direct link quality measurement unit C13, using the reference signal transmitted at step S103, calculates the SINR_UDL. After that, processing proceeds to step S106.

(Step S106) The up access link quality transmission unit B12 sends to the base station device 13 a message (Resource Status Update) that includes information that indicates the SINR_UAL calculated at step S104. After that, processing proceeds to step S107.

(Step S107) The difference calculation unit C14 (quality information receiving unit) receives the information transmitted at step S106. The difference calculation unit C14, based on the SIN_UAL indicated by the received information and the SINR_L calculated at step S105, calculates the difference ΔSINR. Specifically, the difference calculation unit C14 calculates ΔSINR=SINR_UAL−SINR_UDL. After that, processing proceeds to step S108.

(Step S108) The difference transmission unit C15 transmits information that indicates the ΔSINR calculated at step S107 to the mobile station device 11. After that, processing proceeds to step S109.

(Step S109) The down direct link quality measurement unit A12, using the reference signal transmitted by the base station device 13, calculates the SINR_DDL.

The CQI calculation unit A13 (difference receiving unit) receives the ΔSINR regarding which notification was made at step S108. The CQI calculation unit A13, using the SINR_DDL calculated by the down direct link quality measurement unit A12 and the received ΔSINR, calculates the corrected SINR. Specifically, it calculates corrected SINR=SINR_DDL+ΔSINR.

The CQI calculation unit A13 converts the calculated corrected SINR into the CQI, using the quality information correspondence table (the CQI after conversion being the corrected CQI). The CQI transmission unit A14 transmits the corrected CQI calculated by the CQI calculation unit A13 to the base station device 13. After that, processing proceeds to step S110.

(Step S110) The communication control unit C16 receives the corrected CQI transmitted at step S109 and, based on the received corrected CQI, determines the wireless resources to be allocated to the mobile station device 11. The communication control unit C16 also, based on the corrected CQI transmitted at step S109, determines the modulation scheme and encoding scheme to be used by the mobile station device 11.

After that, the wireless communication system 1 repeats the processing of steps S102 to S110. If a judgment is made by that the base station device 13 will perform communication control using the uncorrected CQI, processing proceeds to step S111.

(Step S111) The difference transmission unit C15 transmits to the mobile station device 11 information that indicates that communication control using ΔSINR=0 or the corrected CQI will be stopped. After that, processing proceeds to step S112.

(Step S112) The CQI calculation unit A13 converts the calculated SINR_DDL into the CQI, using the quality information correspondence table (the CQI after conversion being the uncorrected CQI). The CQI transmission unit A14 transmits the uncorrected CQI calculated by the CQI calculation unit A13 to the base station device 13. After that, processing proceeds to step S113.

(Step S113) The communication control unit C16, based on the uncorrected CQI transmitted at step S112, determines the wireless resources to be allocated to the mobile station device 11, and also determines the modulation scheme and encoding scheme to be used by the mobile station device 11. After that, the wireless communication system 1 repeats the processing of steps S111 to S113. If a judgment is made that the base station device 13 will perform communication control using the corrected CQI, the processing returns to step S101.

Figure 9:
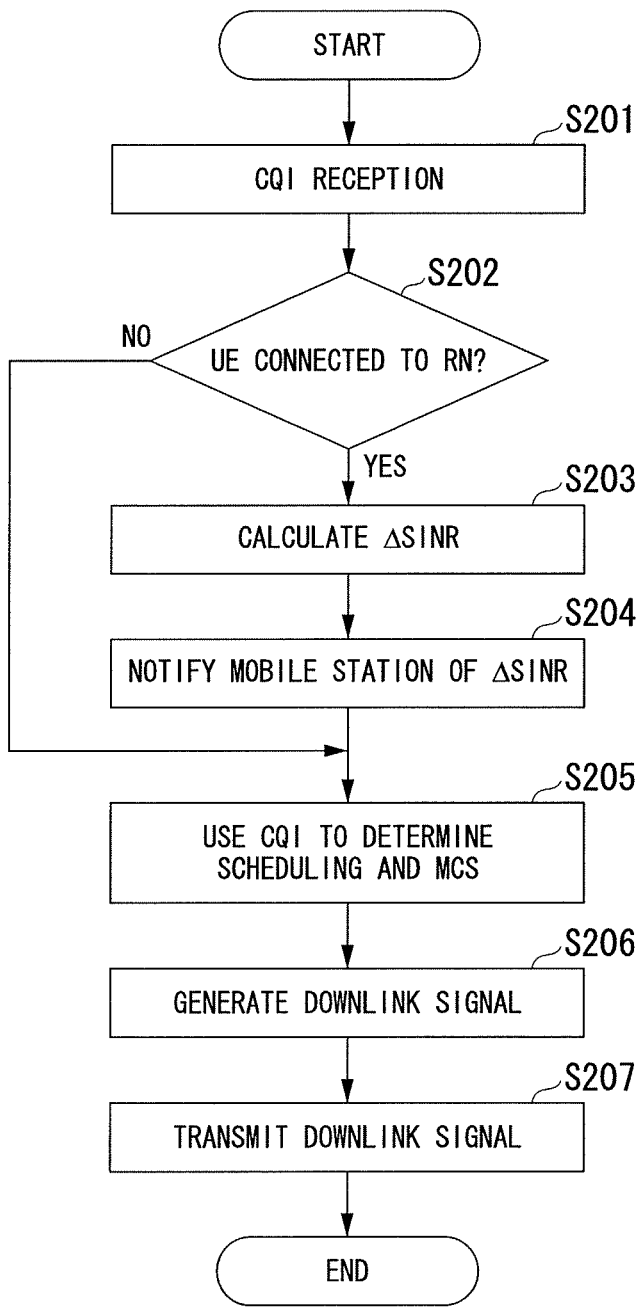
FIG. 9 is a flowchart showing an example of the operation of the eNB control circuit according to the same embodiment.

FIG. 9 is a flowchart that shows an example of the operation of the eNB control circuit C1 according to the present embodiment. The operation of the eNB control circuit C1 of FIG. 9 will be described below, with references made to FIG. 7. Although the example in FIG. 9 only shows the processing with respect to one mobile station device 11, if a plurality of mobile station devices are connected to the base station device 13, a comparison is made with the CQI of other mobile station devices in determining the wireless resources, the modulation scheme, and the encoding scheme (refer to FIG. 10).

(Step S201) The difference calculation unit C14 receives the CQI from the mobile station device 11. After that, processing proceeds to step S202. Although in this embodiment the difference calculation unit C14 receives the CQI via the relay station device 12, the difference calculation unit C14 may receive the CQI directly from the mobile station device 11.

(Step S202) The difference calculation unit C14 makes a judgment as to whether or not the connection destination of the mobile station device 11 is the relay station device 12. In the case in which the connection destination transitions by the time slots that are scheduled, the difference calculation unit C14 makes a judgment as to whether the connection destination after the transition is the relay station device 12 or the base station device 13. If the connection destination is the relay station device 12 (Yes), processing proceeds to step S203. If, however, the connection destination is the base station device 13 (No), processing proceeds to step S205.

(Step S203) The difference calculation unit C14 calculates the ΔSINR. After that, processing proceeds to step S204.

(Step S204) The difference transmission unit C15 makes notification of the ΔSINR to the mobile station device 11. After that, processing proceeds to step S205.

If the connection destination is not the relay station device 12, the difference transmission unit C15 need not notify the mobile station device 11 of the ΔSINR. However, if there is a large possibility of the mobile station device 11 transitioning from the condition of one-hop communication to the condition of two-hop communication, notification of the ΔSINR may be made beforehand. The case of there being a large possibility is, for example, the case in which the communication quality between the mobile station device 11 and the base station device 13 is low, or the case in which the communication quality between the mobile station device 11 and the base station device 13 is high.

(Step S205) The communication control unit C16, based on the CQI received from the mobile station device 11, determines the wireless resources to be allocated to the mobile station device 11 and the modulation and encoding schemes to be used by the mobile station device 11. In this case, if the result of the judgment at step S202 is Yes, the CQI used at step S205 is the corrected CQI. If, however, the result of the judgment at step S202 is No, the CQI used at step S205 is the uncorrected CQI, and may be the CQI that received at step S201, or the CQI received from the mobile station device 11 at step S202 and thereafter. After that, processing proceeds to step S206.

(Step 206) The communication control unit C16 generates a downlink signal addressed to the mobile station device 11, using the modulation scheme and encoding scheme determined at step S205. After that, processing proceeds to step S207.

(Step S207) The communication control unit C16 allocates the downlink signal generated at step S207 to the wireless resources determined at step S205. After that, processing ends.

<Allocation of Wireless Resources>

The allocation of wireless resources will be described below, with references made to FIG. 10 to FIG. 13. In this case, the description is of scheduling and link adaptation control for the case in which the wireless communication system 1 has two mobile station devices 11 (mobile station device 11A and mobile station device 11B).

Figure 10:
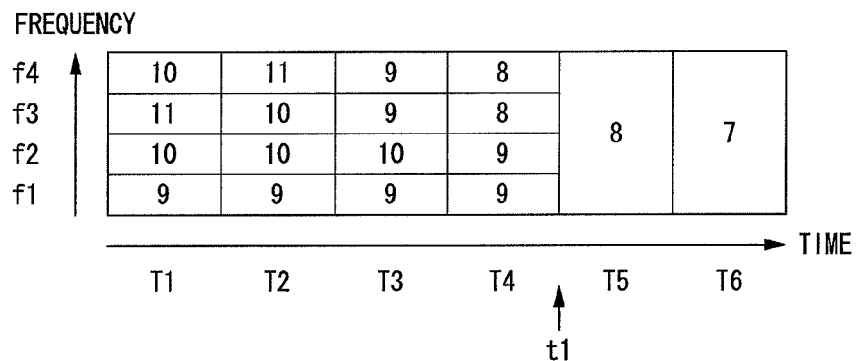
FIG. 10 is a simplified drawing showing an example of uncorrected CQIs at the mobile station device according to the same embodiment.
Figure 11:
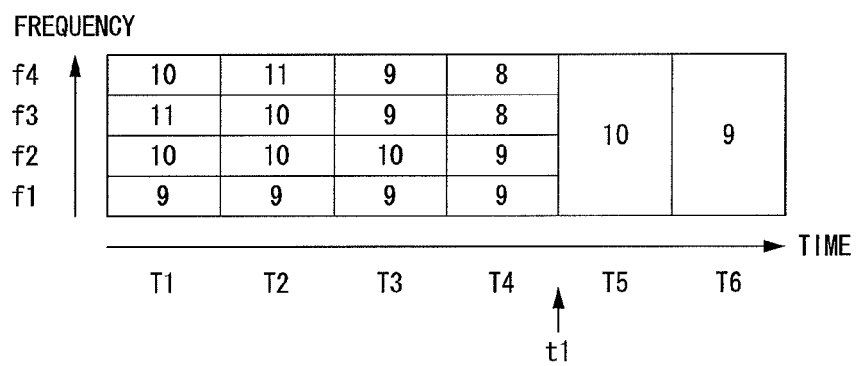
FIG. 11 is a simplified drawing showing an example of corrected CQIs at the mobile station device according to the same embodiment.
Figure 12:
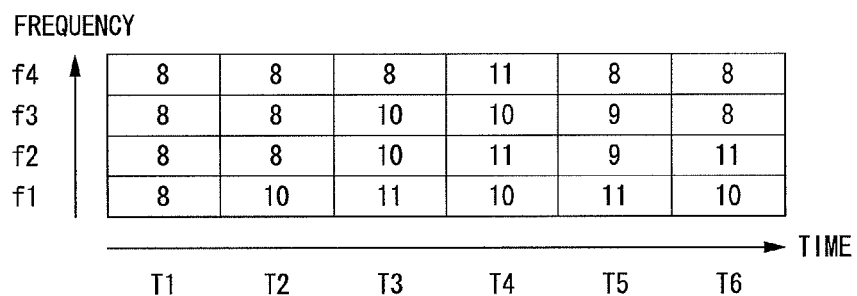
FIG. 12 is a simplified drawing showing an example of CQIs at the mobile station device according to the same embodiment.

FIG. 10 is a simplified drawing that shows an example of the uncorrected CQIs in the mobile station device 11A according to the present embodiment. FIG. 11 is a simplified drawing that shows an example of the corrected CQIs in the mobile station device 11A according to the present embodiment. FIG. 12 is a simplified drawing that shows an example of CQIs in the mobile station device 11B according to the present embodiment. In FIG. 10 to FIG. 12, the horizontal axis indicates time and the vertical axis indicates frequency.

FIG. 10 is a simplified drawing that shows an example of the CQIs transmitted by the mobile station device 11A for the case of using the uncorrected CQI. This drawing shows the CQIs for frequency bands (narrow bands) f1 to f4 (where f1 to f4 are center frequencies) at the times T1 to T4 (where T1 to T4 are center times). For example, in FIG. 10, at time T1 the CQIs for the frequency bands f1 to f4 are, respectively, 9, 10, 11, and 10.

In FIG. 10, for each of times T5 and T6, the CQI (referred to as the wideband CQI) for a frequency band that is the combination of frequency bands f1 to f4 (wide band) is shown. This drawing shows that, at time t1, the mobile station device 11A connects to the relay station device 12 and calculates the wideband CQI (uncorrected CQI). For example, at time T5 the wideband CQI is 8.

Whereas FIG. 10 is the drawing for the case of using the uncorrected CQI, FIG. 11 is the drawing for the case of using the corrected CQI.

FIG. 11 is a simplified drawing that shows examples of the CQIs transmitted by the mobile station device 11A for the case of using the corrected CQI. This drawing shows that, at time t1, the mobile station device 11A connects to the relay station device 12 and calculates the wideband CQI. This drawing shows that, at times T5 and T6, ΔSINR is added to the SINR (SINR_DDL) calculated by the mobile station device 11A, the corrected SINR after the addition being used to calculate the CQI (corrected CQI).

FIG. 11 shows, for example, that at time T5 the wideband CQI is 10. That is, compared with the case of FIG. 10, the wideband CQI is increased by 2.

FIG. 12 is a simplified drawing showing an example of the CQIs transmitted by the mobile station device 11B. This drawing shows that the mobile station device 11B, at times T1 to T6, transmits the narrowband CQI. For example, at time T5 the CQIs for the frequency bands f1 to f4 are, respectively, 11, 9, 9, and 8.

Figure 13:
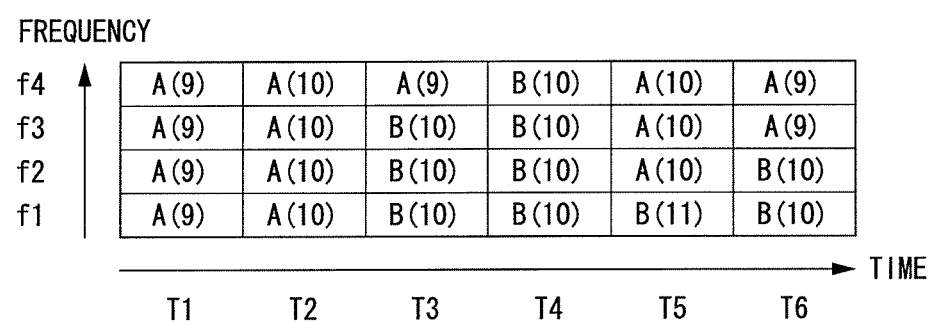
FIG. 13 is a simplified drawing showing an example of wireless resources allocated to a mobile station device.

FIG. 13 is a simplified drawing that shows an example of wireless resources allocated to the mobile station device. This drawing shows the wireless resources allocated to the mobile station device 11A that transmitted the CQIs of FIG. 11 and to the mobile station device 11B that transmitted the CQIs of FIG. 12.

FIG. 13 shows that the base station device 13, in each of the time-frequency regions, allocates wireless resources to mobile station devices having a large CQI value. For example, the base station device 13, at time T5, allocates the frequency bands f2 to f4 to the mobile station device 11A (the CQI of which is 10) and allocates the frequency band f1 to the mobile station device 11B (the CQI of which is 11).

In this manner, according to the present embodiment, the base station device 13 instructs the mobile station device 11 to transmit a reference signal and instructs the relay station device 12 to measure the reference signal transmitted by the mobile station device 11. The base station device 13 receives the SINR_UAL at the relay station device 12, which is the information of the measurement result with respect to the instruction. The base station device 13 measures the reference signal that is transmitted by the mobile station device 11. The base station device 13 calculates the difference ΔSINR between the received SINR_UAL and the measurement result SINR_UDL. The mobile station device 11 measures the reference signal transmitted from the base station device 13. The mobile station device 11 receives the ΔSINR from the base station device. The mobile station device 11, using the measurement result SINR_DDL and the ΔSINR, calculates the corrected SINR, and converts the corrected SINR into the corrected CQI.

By doing this in the present embodiment, the wireless communication system 1 can calculate a CQI that matches the communication path from the relay station device 12 to the mobile station device 11. For example, the wireless communication system 1, even in the case in which the relay station device 12 cannot transmit the reference signal, can calculate a CQI that matches the communication path from the relay station device 12 to the mobile station device 11.

Second Embodiment

The second embodiment of the present invention will be described below in detail, with references made to the drawings.

In the above-described first embodiment, the description was of the case in which the mobile station device 11 calculates the corrected SINR and converts it into the CQI, and in which the base station device 13 controls communication based on the corrected CQI. In the present embodiment, the description is of the case in which the base station device 13 calculates the correction value ΔCQI of the CQI and controls communication based on the CQI at the mobile station device 11 and the calculated ΔCQI.

The mobile station device and the base station device of the present embodiment will be referred to as the mobile station device 21 and the base station device 23. In this case, the mobile station device 21 has a UE control circuit A2 in place of the control circuit A1 of the mobile station device 11, and the base station device 23 has an eNB control circuit C2 in place of the eNB control circuit C1 of the base station device 13.

<Processing Performed by the Control Circuits>

The processing performed by the UE control circuit A2, the RN control circuit B2 and the eNB control circuit C1 will be described in detail below, with references made to FIG. 14 to FIG. 16.

Figure 14:
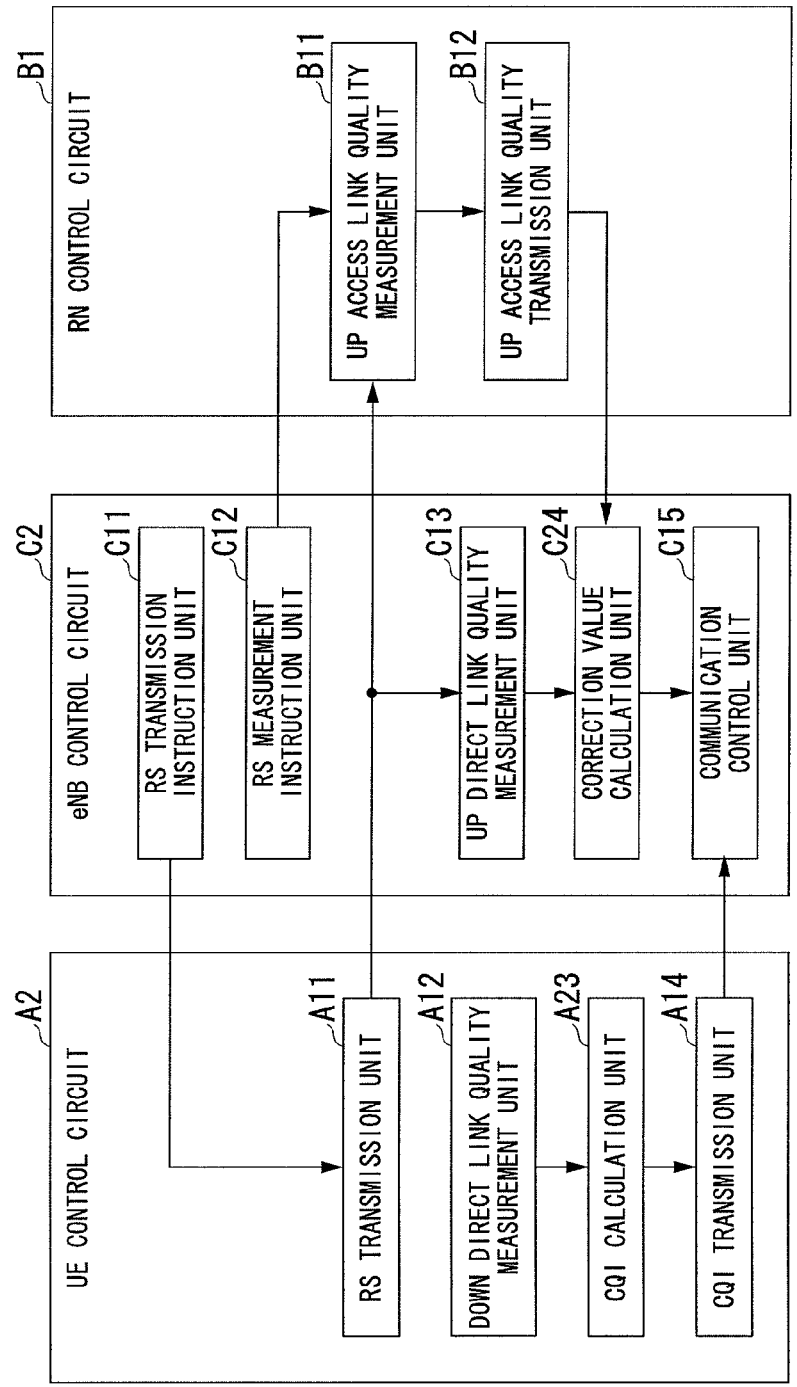
FIG. 14 is a simplified block diagram showing the logical constitution of control circuits according to a second embodiment of the present invention.

FIG. 14 is a simplified block diagram that shows the logical constitution of the various control circuits according to the second embodiment of the present invention. The control circuits (FIG. 14) of the present embodiment, in comparison with the control circuits of the first embodiment (FIG. 7), differ with regard to the CQI calculation unit A23, the correction value calculation unit C24, and the communication control unit C26. However, the functions of the other constituent elements (the RS transmission unit A11, the down direct link quality measurement unit A12, the CQI transmission unit A14, the RS transmission instruction unit C11, the RS measurement instruction unit C12, the up direct link quality measurement unit C13, the up access link quality measurement unit B11, and the up access link quality transmission unit B12) are the same as in the first embodiment. The description of the functions that are the same as in the first embodiment will be omitted.

Figure 15:
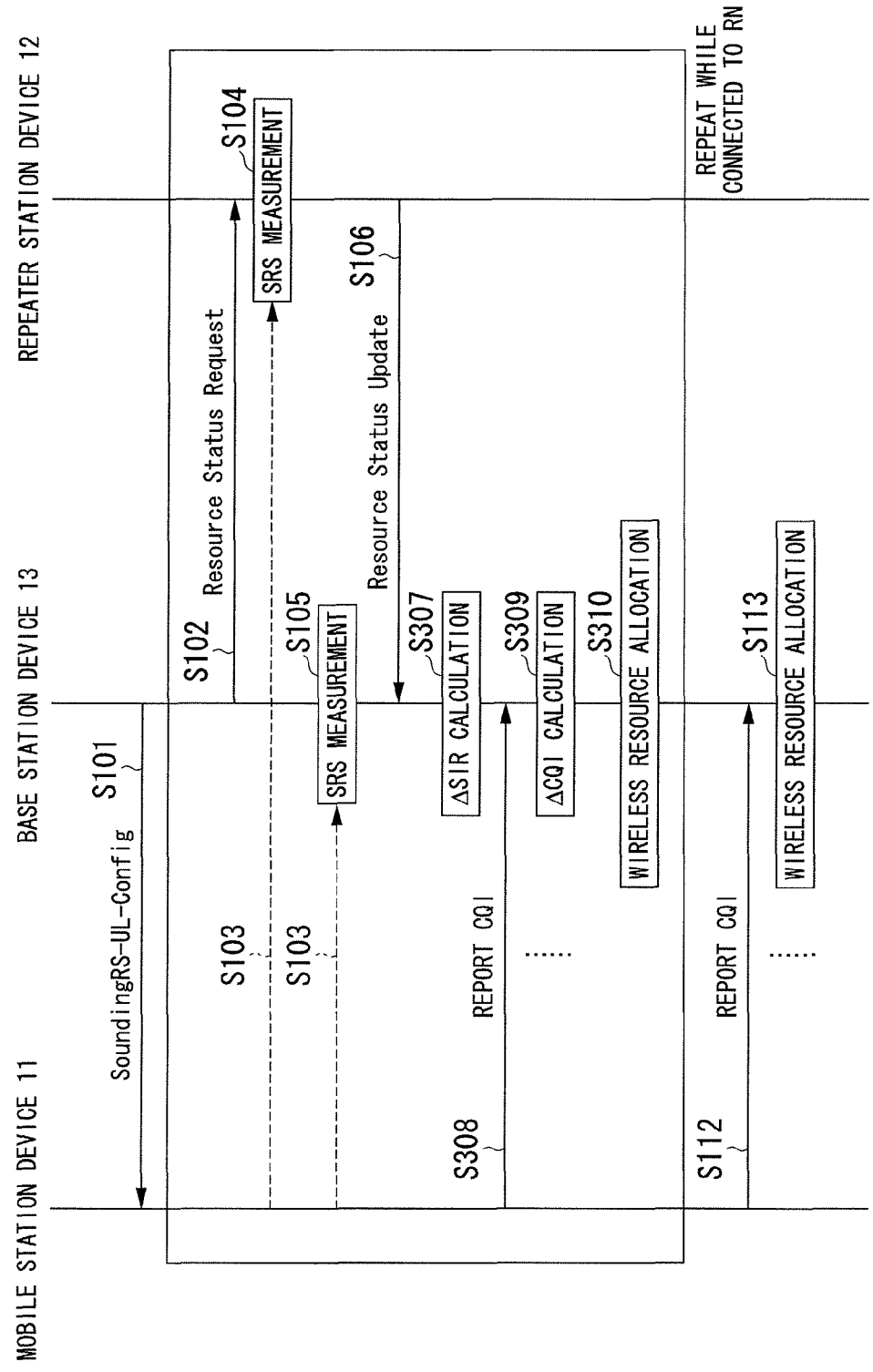
FIG. 15 is a sequence diagram showing an example of the operation of a wireless communication system according to the same embodiment.

FIG. 15 is a sequence diagram that shows an example of the operation of a wireless communication system 2 according to the present embodiment. Comparing the operation of the wireless communication system 2 of the present embodiment (FIG. 15) with the operation of the wireless communication system 1 of the first embodiment (FIG. 8), the processing of steps S307 to S310 is different. However, the other processing (processing of steps S101 to S106, S112, and S113) is the same as in the first embodiment. The description of processing that is the same as in the first embodiment will be omitted.

The operation of the wireless communication system 2 shown in FIG. 15 will be described below, with references made to FIG. 7.

(Step S307) The correction value calculation unit C24, based on the SINK UAL indicated by the information transmitted at step S106 and the SINK_UDL calculated at step S105, calculates the difference ΔSINR. Specifically, the correction value calculation unit C24 calculates ΔSINR=SINR_UAL−SINR_UDL. After that, processing proceeds to step S308.

(Step S308) The down direct link quality measurement unit A12, using the reference signal transmitted by the base station device 13, calculates the SINR_DDL. The CQI calculation unit A23, using the quality information correspondence table, converts the SINR_DDL calculated by the down direct link quality measurement unit A12 into the CQI. The CQI transmission unit A14 transmits the CQI calculated by the CQI calculation unit A23 to the base station device 13. After that, processing proceeds to step S309.

(Step S309) The correction value calculation unit C24, using the CQI transmitted at step S308 and the ΔSINR calculated at step S307, calculates the CQI correction value ΔCQI=f(CQI, ΔSINR). For example, the correction value calculation unit C24 may store beforehand a table of correspondence between ΔCQI, CQI, and ΔSINR and determine ΔCQI using the correspondence table. Also, the correction value ΔCQI may be a function of ΔSINR only. After that, processing proceeds to step S310.

(Step S310) The communication control unit C26, based on the CQI transmitted at step S308 and the ΔCQI calculated at step S309, determines the wireless resources to be allocated to the mobile station device 21 and the modulation scheme and encoding scheme to be used by the mobile station device 21. Specifically, the communication control unit C26 calculates the corrected CQI, which is the CQI transmitted at step S308 to which is added the ΔCQI that is calculated at step S309. The communication control unit C26, based on the corrected CQI, determines the wireless resources and the modulation and encoding schemes.

After that, the wireless communication system repeats the processing of steps S102 to S310. If, however, a judgment is made that the base station device 23 will perform communication control using the uncorrected CQI, processing proceeds to step S112.

Figure 16:
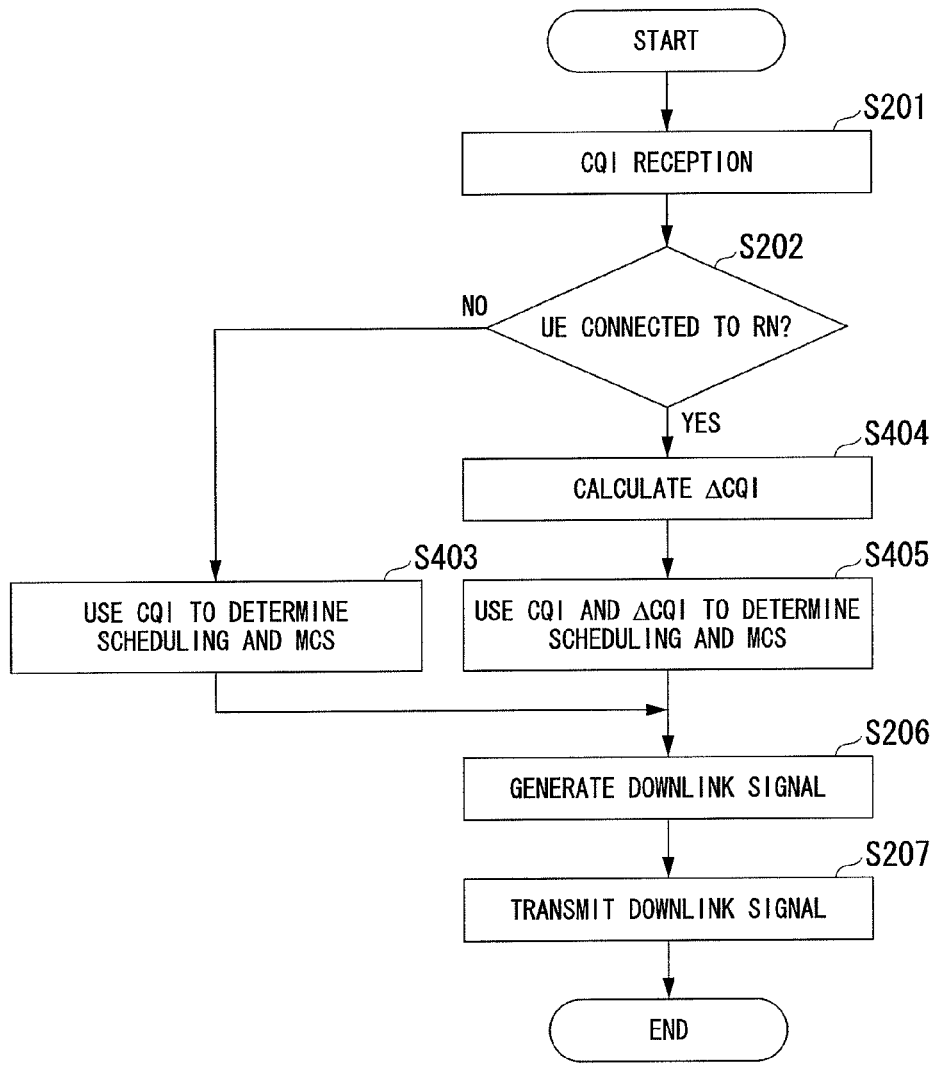
FIG. 16 is a flowchart showing an example of the operation of an eNB control circuit according to the same embodiment.

FIG. 16 is a flowchart that shows an example of the operation of the eNB control circuit C2 according to the present embodiment. Comparing the operation of the eNB control circuit C2 of the present embodiment (FIG. 16) with the operation of the eNB control circuit C1 of the first embodiment (FIG. 9), the processing of steps S404 to S405 is different. However, the processing of the other steps (S201, S202, S206, and S207) is the same as in the first embodiment. The description of processing that is the same as in the first embodiment will be omitted. The operation of the eNB control circuit C2 of FIG. 16 will be described below, making reference to FIG. 14.

(Step S403) The communication control unit C26, based on the CQI received at step S201, determines the wireless resources to be allocated to the mobile station device 21 and the modulation and encoding schemes to be used by the mobile station device 21. After that, processing proceeds to step S206.

(Step S404) The correction value calculation unit C24 outputs the ΔCQI. After that, processing proceeds to step S405.

(Step S405) The communication control unit C26, based on the CQI received at step S201 and the ΔCQI calculated at step S404, calculates the corrected CQI. The communication control unit C26, based on the calculated corrected CQI, determines the wireless resources to be allocated to the mobile station device 21 and the modulation and encoding schemes to be used by the mobile station device 21. After that, processing proceeds to step S206.

<Allocation of Wireless Resources>

The allocation of wireless resources will be described below, using FIG. 10, FIG. 17, FIG. 12, and FIG. 13. Whereas FIG. 10 is a drawing of the case of using the uncorrected CQI, FIG. 17 is a drawing of the case of using the corrected CQI.

Figure 17:
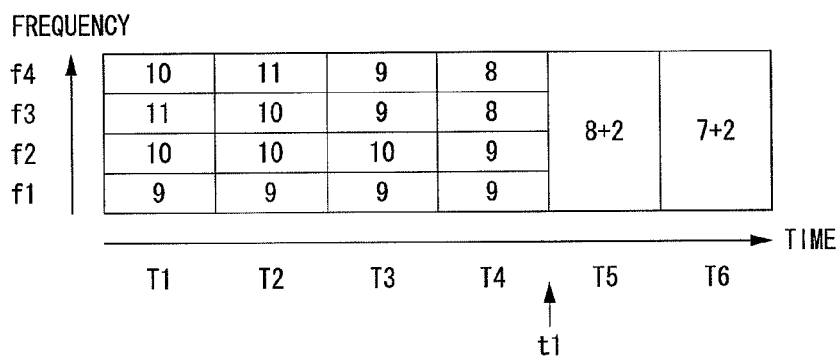
FIG. 17 is a simplified diagram showing an example of CQIs calculated by the base station device according to the same embodiment.

FIG. 17 is a simplified drawing that shows an example of the CQIs calculated by the base station device 23 according to the present embodiment. This drawing is for the case of using a corrected CQI. This drawing shows that, at time t1, the mobile station device 21A connects to the relay station device 12, and calculates the wideband CQI. This drawing also shows that, at times T5 and T6, the corrected CQI is calculated by adding ΔCQI to the CQI transmitted by the mobile station device 11A.

In FIG. 11 shows, for example, that at time T5 the CQI transmitted by the mobile station device 21A is 8 and the ΔCQI is 2. In this case, the base station device 23 determines the wireless resources and the modulation and encoding schemes based on the corrected CQI of 10. That is, compared with the case of FIG. 10, the wideband CQI is increased by 2.

In this manner, according to the present embodiment, the base station device 23 instructs the mobile station device 21 to transmit a reference signal and instructs the relay station device 12 to measurement the reference signal transmitted by the mobile station device 21. The base station device 23 receives the SINR_UAL at the relay station device 12, which is the information of the measurement result with respect to the instruction. The base station device 23 measures the reference signal transmitted by the mobile station device 21. The base station device 23 calculates the difference ΔSINR between the received SINR_UAL and the measurement result SINR_UDL. The mobile station device 11 measures the reference signal that is transmitted from the base station device 13 and notifies the base station device 23 of the measurement result CQI. The base station device 23 calculates the correction value ΔCQI, using the calculated ΔSINR and the CQI regarding which notification was made (or the ΔSINR only). The base station device 23 calculates the corrected CQI, using the CQI and the ΔCQI.

By doing this, in the present invention, the wireless communication system 2 can calculate a CQI (corrected CQI) that matches the communication path from the relay station device 12 to the mobile station device 21.

In the above-described embodiments, the mobile station devices 11 and 21 are described as transmitting information that indicates the calculated CQI to the base station device 13 via the relay station device 12. The present invention is not, however, restricted to this, and the mobile station devices 11 and 21 may transmit information that indicates the calculated CQI directly to the base station device 13.

Also, although the above-described embodiments were described for the case in which the wireless communication systems 1 and 2 use the difference ΔSINR of the SINR for communication control, the present invention is not restricted to this, and the received signal power P may be used in place of the SINR, the difference ΔP thereof being used in communication control. In this case, the received signal power P can be easily calculated by measuring the signal of the transmitting station device. This can be used as a reliable parameter under conditions in which the interference power does not vary greatly (for example, within 1 to 2 dB). By doing this, compared with the case of calculating the ΔSINR, the processing unit 135 can easily calculate the ΔP and obtain data in a short time, and the load on hardware or software can be made small. Also, for example, the processing unit 135 may, based on the size of the variation of the interference power, determine whether to calculate the ΔSINR or calculate the ΔP.

Also, in the above-described embodiments, although the description was for the case of the wireless communication systems 1 and 2 using the difference ΔSINR of the SINR in communication control, the present invention is not restricted to this, and receiving quality information may be used in place of the SINR, and the difference thereof may be used in communication control. The receiving quality information is, for example, an index representing the communication quality, such as expressed by the error rate, which influences the user data throughput and delay. The processing unit 135, in measuring the receiving quality information, performs an observation for a relative long period of time (for example, approximately 1 to 10 seconds) and, for example, calculates the block error rate by error detection using CRC, taking this as the receiving quality information. By doing this, the processing unit 135 can calculate the receiving quality information as a good index, by comparing a condition under which there is no variation in the propagation path conditions and a condition in which there are great variations.

In the above-described embodiments, the base station devices 13 and 23 need not use a received or calculated CQI as is in determining the MCS. For example, in the LTE standard, there is no selection of MCSs that differ by having different frequency resources within a plurality of the same subframes. For this reason, the base station devices 13 and 23 may determine the MCS corresponding to the minimum CQI (for example, determine the MCS corresponding to the minimum CQI value of 9 at time T1 in FIG. 1). Alternatively, the base station devices 13 and 23 may determine the MCS corresponding to the average CQI value (for example, determine the MCS corresponding to the average CQI value of 10 at time T1 in FIG. 10).

In the above-described embodiments, the description was for the case in which the wireless communication system calculates the SINR. In a wireless communication system, although using the SINR imparts more load than calculation of the received signal power P, greater reliability is obtained. On the other hand, because the SINR, in contrast to the receiving quality information, does not require observation for a long time, the method of using SINR is one that achieves a balance between reliability and calculation load (processing time, amount of processing, and the like).

In the above-described embodiments, the description was for the case in which the wireless communication system uses the CQI. In a wireless communication system, compared with the use of the SINR, by using the CQI, although the accuracy deteriorates, it is possible to reduce the amount of information. Thus, the method of using the CQI is a method that is effective in the case, for example, in which a simple notification is sufficient.

Also, in the above-described first embodiment, the mobile station device 11 may transmit the SINR_DDL to the base station device 13 and the base station device 13 may calculate the corrected SINR and convert it into the corrected CQI.

In the above-described second embodiment, the base station device 23 may transmit the ΔCQI to the mobile station device 21, and the mobile station device 21 may calculate the corrected CQI and transmit it to the base station device 23.

A part of the mobile station devices 11 and 21, the relay station device 12, and the base station devices 13 and 23 (for example, the RS transmission unit A11, the down direct link quality measurement unit A12, the CQI calculation units A13 and A23, the CQI transmission unit A14, the up access link quality measurement unit B11, the up access link quality transmission unit B12, the correction value calculation unit C24, the RS transmission instruction unit C11, the RS measurement instruction unit C12, the up direct link quality measurement unit C13, the difference calculation unit C14, the difference transmission unit C15, and the communication control units C16 and C26) in the above-described embodiments may be implemented by a computer. In this case, a program that implements these control functions may be recorded in a computer-readable storage medium, and a computer system made to read in and execute the program. The term "computer system" used herein means a computer system that is incorporated into the mobile station devices 11 and 21, the relay station device 12, or the base station devices 13 and 23, including an operating system and also hardware, such as peripheral devices. The term "computer-readable storage medium" refers to a portable medium, such as a flexible disk, an optical-magnetic disc, a ROM, and a CD-ROM, and a storage device, such as a hard disk, that is built into a computer system. Additionally, the term "computer-readable storage medium" includes a medium that dynamically retains a program for a short time, for example, a communication line when the program is transmitted via a network such as the Internet, a communication line such as a telephone line, as well as a medium to retain a program for a certain time, for example, a non-volatile memory internally provided in a computer system acting as the server and client in that case. The program may have the object of implementing a part of the above-described functions, and it may also implement the above-described functions in combination with a program already stored in a computer system.

A part or all of the mobile station devices 11 and 21, the relay station device 12, and the base station devices 13 and 23 may be implemented as an LSI (large-scale integration) device or the like. The various blocks of the mobile station devices 11 and 21, the relay station device 12, and the base station devices 13 and 23 may be made into individual processors, and a part or all thereof may be integrated into a processor. The method of implementation by circuit integration is not restricted to being LSI, but may also be by a dedicated circuit or by a general-purpose processor. In the case of the appearance of integrated circuit technology which take the place of LSIs by advancements in semiconductor technology, it still possible to use an integrated circuit according to the present technology.

Although the embodiments of the present invention are described in detail above with references made to the accompanying drawings, the specific constitution thereof is not restricted to the above, and various design changes and the like are possible as long as they are encompassed within the scope thereof, without departing from the spirit of the present invention.

INDUSTRIAL APPLICABILITY

The present invention can be used in a mobile communication system in which a mobile telephone device is a terminal device.

REFERENCE SYMBOLS

11, 21: Mobile station device
111: Transmitting and receiving antenna
112: Transmitting and receiving circuit
113: Storage unit
114: Processing unit
115: Peripheral circuit
A1, A2: UE control circuit
12: Relay station device
121: Transmitting and receiving antenna
122: Transmitting and receiving circuit with respect to the UE
123: Transmitting and receiving circuit with respect to the eNB
124: Storage unit
125: Processing unit
B1: RN control circuit
13, 23: Base station device
131: Transmitting and receiving antenna
132: Transmitting and receiving circuit with respect to the UE
133: Transmitting and receiving circuit with respect to the RN
134: Storage unit
135: Processing unit
136: NW side communication circuit
C1, C2: eNB control circuit
A11: RS transmission unit
A12: Down direct link quality measurement unit
A13, A23: CQI calculation unit
A14: CQI transmission unit
B11: Up access link quality measurement unit
B12: Up access link quality transmission unit
C24: Correction value calculation unit C11: RS transmission instruction unit
C12: RS measurement instruction unit
C13: Up direct link quality measurement unit
C14: Different calculation unit
C15: Difference transmission unit
C16, C26: Communication control unit

The invention claimed is:

1. A base station device communicating with a mobile station device, either directly or via a relay station device, the base station device comprising:
   a reference signal transmission instruction unit configured to instruct the mobile station device to transmit a first reference signal;
   a reference signal measurement instruction unit configured to instruct the relay station device to measure the first reference signal transmitted by the mobile station device;
   a quality information receiving unit configured to receive first information, the first information indicating a first receiving quality at the relay station device, the first information indicating a measurement result with respect to the instruction from the reference signal measurement instruction unit;
   an up access link quality measurement unit configured to measure a second reference signal transmitted by the mobile station device; and
   a difference calculation unit configured to calculate a difference between the first information and second information, the second information indicating a second receiving quality of the second reference signal measured by the up access link quality measurement unit.

2. The base station device according to claim 1, the base station device further comprising:
   a difference transmission unit configured to notify the mobile station device of the difference calculated by the difference calculation unit.

3. The base station device according to claim 1, the base station device further comprising:
   a correction value calculation unit, based on the difference calculated by the difference calculation unit, configured to calculate a correction value of third information, the third information indicating a third receiving quality at the mobile station device.

4. The base station device according to claim 3, wherein the third information is channel quality information.

5. The base station device according to claim 1, wherein the difference is a difference of a signal-to-interference-plus-noise power ratio.

6. The base station device according to claim 1, wherein the difference is a difference of a received power.

7. A mobile station device communicating with a base station device, either directly or via a relay station device, the mobile station device comprising:
   a reference signal transmission unit configured to transmit a first reference signal, the transmission of the first reference signal being performed based on an instruction from the base station device;
   a down direct link quality measurement unit configured to measure a second reference signal transmitted by the base station;
   a difference receiving unit configured to receive difference information from the base station device, the difference information being a difference between first information and second information, the first information indicating a first receiving quality at the relay station device, the first information indicating a measurement result with respect to the instruction from the base station device, the second information indicating a second receiving quality of the first reference signal measured by the base station device; and
   a receiving quality calculation unit configured to calculate third information, the third information indicating a third receiving quality at the mobile station device, the calculation of the third information being performed by using the measurement result at the down direct link quality measurement unit and the difference information received by the difference receiving unit.

8. The mobile station device according to claim 7, wherein the difference information is information indicating a difference between a first signal-to-interference-plus-noise power ratio at the relay station device and a second signal-to-interference-plus-noise power ratio at the base station device, the first and second signal-to-interference-plus-noise power ratios being calculated using the first reference signal transmitted by the reference signal transmission unit.

9. The mobile station device according to claim 7, wherein the difference information is information indicating a difference between a first received power at the relay station device and a second received power at the base station device, the first and second received powers being calculated using the first reference signal transmitted by the reference signal transmission unit.

10. A communication control method performed in a communication system, the communication system comprising a base station device, a relay station device, and a mobile station device, the mobile station device communicating with the base station device, either directly or via the relay station device, the communication control method comprising:
    instructing, by a reference signal transmission instruction unit of the base station device, the mobile station device to transmit a first reference signal;
    instructing, by a reference signal measurement instruction unit of the base station device, the relay station device to measure the first reference signal transmitted by the mobile station device;
    measuring, by an up access link quality measurement unit of the base station device, the first reference signal transmitted to the base station device from the mobile station device;
    calculating, by a difference calculation unit of the base station device, a difference between first information and second information, the first information indicating a first receiving quality at the relay station device, the first information being a measurement result with respect to the instruction by the reference signal measurement instruction unit, the second information indicating a second receiving quality of the first reference signal measured by the up access link quality measurement unit;
    measuring, by a down direct link quality measurement unit of the mobile station device, a second reference signal transmitted to the mobile station device from the base station device; and
    calculating, by a receiving quality calculation unit of the mobile station device, third information, the third information indicating a third receiving quality at the mobile station device, the calculation of the third information being performed by using the measurement result by the down direct link quality measurement unit and the difference calculated by the difference calculation unit.

11. A communication control method in a communication system, the communication system comprising a base station device, a relay station device, and a mobile station device, the mobile station device communicating with the base station device, either directly or via the relay station device, the communication control method comprising:

instructing, by a reference signal transmission instruction unit of the base station device, the mobile station device to transmit a first reference signal;

instructing, by a reference signal measurement instruction unit of the base station device, the relay station device to measure the first reference signal transmitted by the mobile station device;

measuring, by an up access link quality measurement unit of the base station device, the first reference signal transmitted to the base station device from the mobile station device;

calculating, by a difference calculation unit of the base station device, a difference between first information and second information, the first information indicating a first receiving quality at the relay station device, the first information being a measurement result with respect to the instruction from the reference signal transmission instruction unit, the second information indicating a second receiving quality of the first reference signal measured by the up access link quality measurement unit;

calculating, by a correction value calculation unit of the base station device, a correction value of second information, the second information indicating a second receiving quality at the mobile station device, the calculation of the correction value being performed based on the difference calculated by the difference calculation unit;

measuring, by a down direct link quality measurement unit of the mobile station device, a second reference signal transmitted to the mobile station device from the base station device; and calculating, by a receiving quality calculation unit of the mobile station device, third information, the third information indicating a third receiving quality at the mobile station device, the calculation of the third information being performed by using the measurement result by the down direct link quality measurement unit and the difference calculated by the correction value calculation unit.

12. The base station device according to claim 1, wherein the reference signal transmission instruction unit is configured to instruct the mobile station device to transmit the first reference signal to the base station device and the relay station device.

13. The base station device according to claim 1, wherein the relay station device is configured to transmit no reference signal to the mobile station device.

14. The base station device according to claim 2, wherein the base station device is configured to receive, from the mobile station device, a corrected third receiving quality calculated by the mobile station device, the calculation of the corrected third receiving quality being performed based on the difference transmitted by the difference transmission unit and the second reference signal transmitted from the base station device to the mobile station device, and the base station device is configured to perform, based on the corrected third receiving quality, at least one of a first process and a second process, the first process being a determination of wireless resources to be allocated to the mobile station device, the second process being a determination of a modulation scheme and an encoding scheme to be used by the mobile station device.

* * * * *